US012789850B1

(12) United States Patent
Bosse et al.

(10) Patent No.: US 12,789,850 B1
(45) Date of Patent: Nov. 10, 2026

(54) OBJECT DETECTION USING CLUSTER TRACKING

(71) Applicant: Zoox, Inc., Foster City, CA (US)

(72) Inventors: Michael Carsten Bosse, Templeton, CA (US); Karl Andreas Granstrom, San Francisco, CA (US); Gene Brown Merewether, Wellesley, CA (US); Francesco Papi, Oakland, CA (US); Zachary Sun, San Francisco, CA (US); John Welling Ware, Cambridge, CA (US)

(73) Assignee: Zoox, Inc., Foster City, CA (US)

( * ) Notice: Subject to any disclaimer, the term of this patent is extended or adjusted under 35 U.S.C. 154(b) by 416 days.

(21) Appl. No.: 18/500,030

(22) Filed: Nov. 1, 2023

(51) Int. Cl.
*B60W 60/00* (2020.01)
*G06T 7/246* (2017.01)
(Continued)

(52) U.S. Cl.
CPC ......... *B60W 60/0016* (2020.02); *G06T 7/246* (2017.01); *G06T 7/73* (2017.01);
(Continued)

(58) Field of Classification Search
CPC ....... B60W 60/0016; B60W 2420/403; B60W 2554/4041; G06T 7/246; G06T 7/73; G06T 2207/20081; G06T 2207/30241; G06T 2207/30261; G06V 10/225; G06V 10/762; G06V 20/58
See application file for complete search history.

(56) References Cited

U.S. PATENT DOCUMENTS 11,951,991 B2 * 4/2024 Russell ................. B60W 40/04
11,987,261 B2 * 5/2024 Brown ............. G08G 1/096816
(Continued)

FOREIGN PATENT DOCUMENTS

CN 112098992 A * 12/2020 ............. G06F 18/23
CN 116309701 A * 6/2023 ............. G06T 7/246

OTHER PUBLICATIONS

George Thomaidis, Manolis Tsogas, Panagiotis Lytrivis, Giannis Karaseitanidis, Angelos Amditis. Multiple hypothesis tracking for data association in vehicular networks. Information Fusion, vol. 14, Issue 4, 2013, pp. 374-383 (Year: 2013).*
(Continued)

*Primary Examiner* — Delomia L Gilliard
(74) *Attorney, Agent, or Firm* — Lee & Hayes, P.C.

(57) ABSTRACT

Techniques for object detection using cluster tracking are described herein. In some cases, the techniques include: detecting, based on sensor data associated with a vehicle's environment and using a 3D object detection model, a 3D bounding area corresponding to a track associated with a first object; determining, based on the sensor data, a cluster track as a cluster of point of tracks in the environment that collectively move across a time period associated with the sensor data; determining that the 3D bounding area and the cluster track are related; determining a mismatch region of the first cluster track that is a portion of the cluster track that is outside the 3D bounding area; updating the 3D bounding area to include a second 3D bounding area corresponding to the mismatch region; and controlling the vehicle based on the updated 3D bounding area.

20 Claims, 5 Drawing Sheets

(51) Int. Cl.
*G06T 7/73* (2017.01)
*G06V 10/22* (2022.01)
*G06V 10/762* (2022.01)
*G06V 20/58* (2022.01)

(52) U.S. Cl.
CPC .......... *G06V 10/225* (2022.01); *G06V 10/762* (2022.01); *G06V 20/58* (2022.01); *B60W 2420/403* (2013.01); *B60W 2554/4041* (2020.02); *G06T 2207/20081* (2013.01); *G06T 2207/30241* (2013.01); *G06T 2207/30261* (2013.01)

(56) References Cited

U.S. PATENT DOCUMENTS

| | | | | |
|---|---|---|---|---|
| 12,441,366 | B2 * | 10/2025 | Farid | B60W 30/09 |
| 2017/0151943 | A1 * | 6/2017 | Goto | G08G 1/166 |
| 2018/0322650 | A1 * | 11/2018 | Becker | G06V 20/58 |
| 2019/0227545 | A1 * | 7/2019 | Yoo | B60W 60/0059 |
| 2020/0180650 | A1 * | 6/2020 | Lee | B60W 50/14 |
| 2020/0320339 | A1 * | 10/2020 | Rawashdeh | G01S 17/42 |
| 2020/0377124 | A1 * | 12/2020 | Kienle | B60W 60/0027 |
| 2021/0116932 | A1 * | 4/2021 | Fowe | G05D 1/0246 |
| 2023/0333252 | A1 * | 10/2023 | Pazhayampallil | G01S 17/89 |
| 2023/0342954 | A1 * | 10/2023 | Liang | G06T 7/246 |
| 2024/0371175 | A1 * | 11/2024 | Ikeda | G06V 10/762 |
| 2024/0411007 | A1 * | 12/2024 | Critchley | G01S 13/723 |
| 2025/0002031 | A1 * | 1/2025 | Chao | B60W 50/14 |
| 2025/0355438 | A1 * | 11/2025 | Chen | G05D 1/0088 |

OTHER PUBLICATIONS

A. Y. S. Chia and W. Huang, "Multiple Objects Trackingwith Multiple Hypotheses Dynamic Updating," 2006 International Conference on Image Processing, Atlanta, GA, USA, 2006, pp. 569-572, doi: 10.1109/ICIP.2006.312399. (Year: 2006).*

Bosse et al., "Determining Object Orientation Based on Parameter Modes," U.S. Appl. No. 18/087,601, filed Jan. 19, 2023, 60 pages.

* cited by examiner

OBJECT DETECTION USING CLUSTER TRACKING

BACKGROUND

A vehicle may be equipped with various systems to detect objects in an environment and use detection information to control the vehicle to avoid the objects. Detected objects may include objects in motion or that may potentially be in motion, such as other vehicles, bicycles, pedestrians, etc. To plan trajectories and safely navigate around objects in the environment, a vehicle's trajectory planning system may determine the presence and/or various attributes of such objects, including position, heading, yaw, velocity, and/or acceleration.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
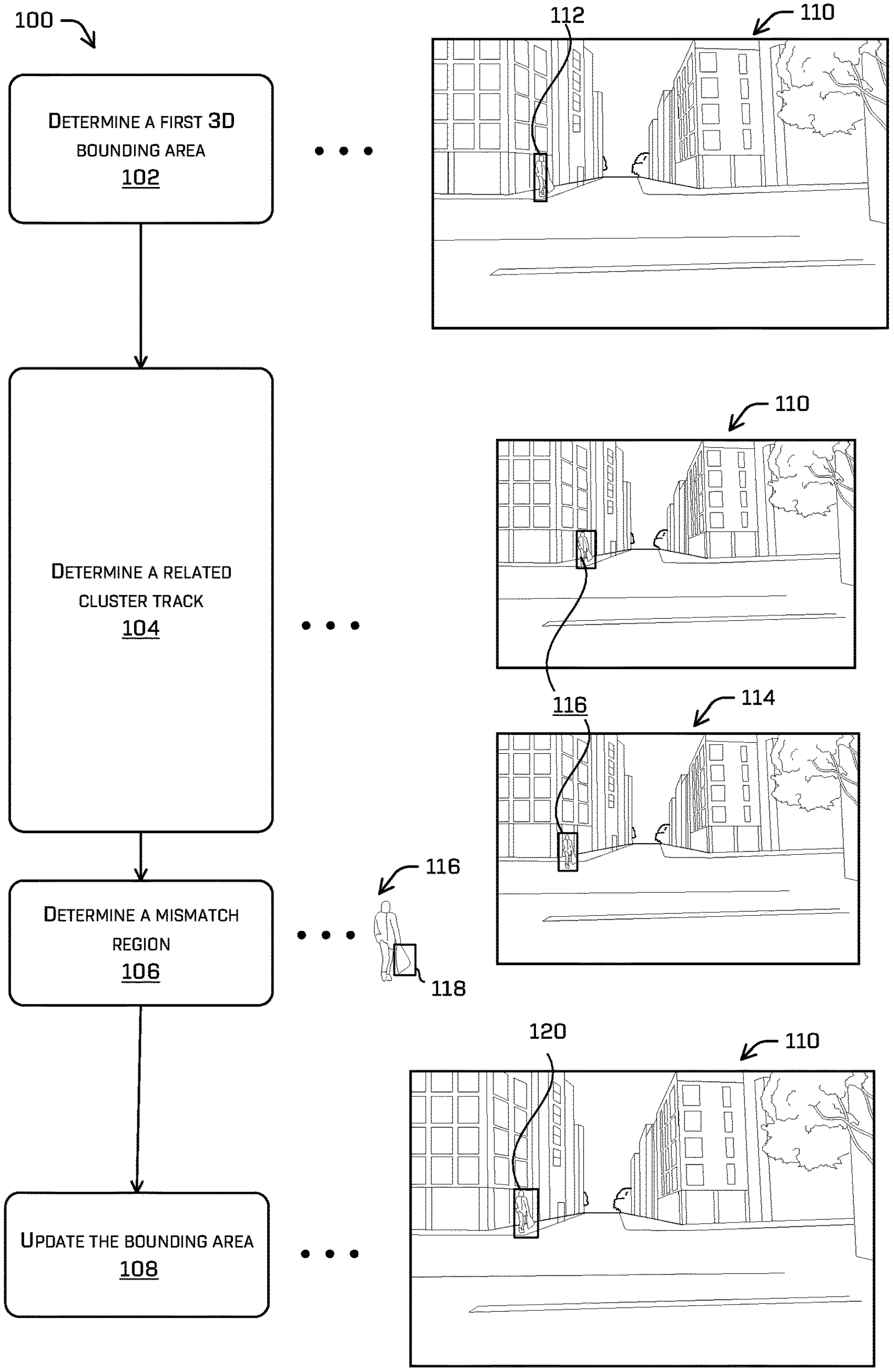
FIG. 1 is a flowchart diagram of an example process for determining a three-dimensional (3D) bounding area using a 3D object detection model and a cluster tracker model.

This document describes techniques for combining the outputs of a three-dimensional (3D) object detection model and a cluster tracker model to detect an object in an environment of a vehicle. In some cases, the techniques described herein can be used by a perception component of a vehicle computing device to generate a perception output representing one or more objects that are in the environment of the vehicle. This perception output may then be used by other components of the vehicle computing device to generate a trajectory for the vehicle in a manner configured to increase a likelihood that the vehicle is operated in a manner that complies with relevant traffic regulations and avoids collision with other objects in the vehicle environment. Accordingly, the techniques discussed herein may improve the safety of occupants of an autonomous vehicle that incorporates the techniques discussed herein. Moreover, the techniques may improve the efficiency of a vehicle, such as an autonomous vehicle, in accomplishing a mission such as, for example, delivering passengers and/or cargo, surveying a region, or the like.

In some cases, the techniques described herein include: (i) detecting, based on sensor data associated with the vehicle's environment and using a 3D object detection model, a 3D bounding area corresponding to a track associated with a first object in the environment, (ii) determining, based on the sensor data, a cluster track as a cluster of point tracks in the environment that collectively move across a time period associated with the sensor data, (iii) determining that the 3D bounding area and the cluster track are related, (iv) determining a mismatch region of the first cluster track that is a portion of the cluster track that is outside the 3D bounding area, (v) updating the 3D bounding area to include a second 3D bounding area corresponding to the mismatch region, and/or (vi) controlling the vehicle based on the updated 3D bounding area.

In some cases, the techniques described herein include detecting a 3D bounding area in the vehicle environment using a 3D object detection model. The 3D object detection model may include at least one of a model configured to detect an object based on one or more assumptions about one or more object properties (e.g., object shapes, object movement patterns, object velocities, and/or the like) or a machine learning model.

The 3D bounding area representing a detected object may represent a dynamic contour that adapts over time to match the changing shape and pose of the object. As the object moves and rotates in the environment, the estimated shape and orientation of the object may vary across sensor data frames. Correspondingly, the bounding area may be continually updated frame-by-frame to encapsulate the evolving outline of the object.

For example, the 3D object detection model may be a model that is configured to: (i) receive a set of sensor data frames (e.g., a set of lidar point clouds) associated with the vehicle environment in relation to a set of times (e.g., a sequence of times), (ii) determine, within each frame and using a statistical model characterized by an assumption about vehicle shape (e.g., the shape of a particular type of vehicle), a 3D bounding area that is detected to represent a vehicle, (iii) determine, based on an assumption about vehicle movement pattern (e.g., using a Kalman filter or a particle filter), that the set of 3D bounding areas determined for the set of frames correspond to a vehicle moving in the environment, and (iv) based on determining that the set of 3D bounding areas correspond to the vehicle moving in the environment, determine an object detection track based on the set of 3D bounding areas. The sensor data may be associated with various sensor modalities.

Accordingly, in some cases, the 3D object detection model may be configured to process sensor data associated with the vehicle environment to determine a 3D bounding area that is predicted to represent an object in the vehicle environment. The 3D bounding area may be determined using a statistical model characterized by one or more assumptions about object shapes. For example, the statistical model may be characterized by assumptions about vehicle shape, pedestrian shape, motorcycle shape, shapes associated with one or more static roadway objects (e.g., traffic lights, stop signs, and/or the like), shapes associated with different categories of vehicles, and/or the like. The statistical model may also use data about a 3D bounding area detected in a sensor data frame associated with a previous frame and may use such data along with assumptions about movement patterns and/or velocity patterns of objects to determine a 3D bounding area in a subsequent sensor data frame (e.g., subsequent to the previous frame, such as in a current frame). Examples of assumptions about movement and/or velocity patterns of objects may include assumptions about movement and/or velocity patterns of vehicles (e.g., cars, trucks, vans, motorcycles, etc.), pedestrians, animals, and/or the like.

In some cases, the 3D object detection model may include a machine learning model that is configured to process sensor data (e.g., one or more lidar point clouds) associated with the vehicle environment to determine a 3D bounding area in the vehicle environment that is predicted to depict an object and/or a track characterized by a set of 3D bounding areas in the vehicle environment that correspond to movement of an object in the environment across a set of times. For example, in some cases, the machine learning model may be configured to process a sensor data frame to generate output data (e.g., coordinates associated with) a 3D bounding area in the vehicle environment (e.g., along with a classification of the object that is predicted to be represented by the 3D bounding area, such as a classification indicating that the 3D bounding area is predicted to depict a vehicle, pedestrian, and/or the like). As another example, in some cases, the machine learning model may be configured to process a set of (e.g., a sequence of) sensor data frames to generate output data (e.g., coordinates associated with) a set of 3D bounding areas in the vehicle environment that are predicted to represent the same object across time (e.g., along with a classification of the object that is predicted to be represented by the set of 3D bounding areas, such as a classification indicating that the 3D bounding areas are predicted to depict a vehicle, pedestrian, and/or the like). In some cases, the machine learning model may be trained based on training data that represents labeled 3D bounding areas and/or labeled tracks within a set of sensor data frames.

In some cases, the 3D object detection model includes a multi-hypothesis detection model that is configured to process a sensor data frame to determine two or more hypotheses about object detections within the sensor data frame. Each hypothesis may represent a set of candidate 3D bounding areas within the sensor data frame. A candidate 3D bounding area may be a 3D bounding area that has been determined by the 3D object detection model but has not been selected as the output of the 3D object detection model.

For example, a first hypothesis may associate a region of the environment to a first 3D bounding area and/or a first track, while a second hypothesis may associate a first sub-region of that region with a second bounding area and/or a second track and a second sub-region of that region with a third bounding area and/or a third track. As another example, a first hypothesis may associate a region of the environment to a first 3D bounding area and/or a first track, while a second hypothesis may associate a first sub-region of that region with a second bounding area and/or a second track, a second sub-region of that region with a third bounding area and/or a third track, and a third sub-region of that region with no bounding areas and/or tracks. Accordingly, different environment regions may be associated with different objects (e.g., with different 3D bounding areas and/or tracks) in accordance with different hypotheses, with the different hypotheses representing uncertainties and/or probabilities about object detections based on sensor data. For example, the hypotheses may represent an uncertainty about whether a segment of the environment includes a single vehicle, two motorcycles following each other, and/or a single vehicle that is parked in front of a static roadway object. In some cases, the different hypotheses are determined based on sensor data from different sensor modalities.

In some cases, the multi-hypothesis detection model may be configured to: (i) receive a set of hypotheses generated in relation to a sensor data frame and/or a set of sensor data frames, (ii) generate a score for each of the hypotheses, and (iii) determine whether to select a subset of the hypotheses based on the generated hypothesis scores. The hypothesis score associated with a hypothesis may, for example, be generated based on correspondence of one or more candidate 3D bounding areas associated with the hypothesis to one or more 3D bounding areas detected in relation to one or more previous frames (e.g., as determined using one or more models that integrate assumptions about expected object movements). In some cases, the multi-hypothesis detection model continues to maintain multiple hypotheses about object detection within the environment (e.g., within a region of the environment) until the hypothesis score for a hypothesis satisfies a threshold (e.g., a threshold determined based on a distribution of hypothesis scores associated with the multiple hypotheses) and that hypothesis is selected. Afterward, the candidate 3D bounding areas corresponding to the selected hypotheses may be selected as the set of 3D bounding areas output by the multi-hypothesis detection model.

For example, consider an environment in which a first sedan vehicle partially occludes perception of a second sedan vehicle at a first time and no longer blocks perception of the second vehicle at a second time. In this example, based on sensor data associated with the first time, the multi-hypothesis detection model may generate a first hypothesis that associates the perceived region with two 3D bounding areas associated with two sedan vehicles and a second hypothesis that associates the perceived region with one 3D bounding area associated with a bus vehicle. The multi-hypothesis detection model may refrain from selecting one hypothesis based on the sensor data associated with the first time. However, after processing the sensor data associated with the second time, the multi-hypothesis detection model may increase the hypothesis score associated with the first hypothesis and/or decrease the hypothesis score associated with the second hypothesis. Subsequently, the multi-hypothesis detection model may be configured to select the first hypothesis and output the two sedan-related 3D bounding areas as the output of the multi-hypothesis detection model.

In some cases, a hypothesis (e.g., a "mode") of the multi-hypothesis detection model may represent one or more probability distributions about one or more predicted parameters associated with one or more objects in the vehicle environment. For example, a hypothesis may include one or more physical parameters such as object position, orientation, velocity, acceleration, and/or the like. The parameters may also, or instead, include non-physical parameters such as object classification, object labels, and/or the like. In some cases, each hypothesis is associated with a Gaussian distribution and the set of hypotheses may thus represent a set of distributions (e.g., a mixture model, such as a Gaussian mixture model). In some cases, the set of hypotheses correspond to a mixture model in which each hypothesis is associated with a distribution over the parameters and a probability (e.g., a probability determined based on the hypothesis score associated with the hypothesis). Example techniques for using mixture models for multi-hypothesis detection are described in U.S. patent application Ser. No. 18/087,601, entitled "Determining Object Orientation Based on Parameter Modes," filed on Dec. 22, 2022, which is incorporated herein by reference in its entirety and for all purposes.

In some cases, the 3D bounding areas and/or tracks detected by the 3D object detection model may have systematic shortcomings in some scenarios. For example, because the 3D object detection model may be characterized by one or more expected patterns about object properties (e.g., via explicit statistical assumptions and/or via patterns observed during training), the 3D object detection model may fail to accurately detect 3D bounding areas associated with objects whose properties substantially deviate from those expected patterns. As a result, the output of the 3D object detection model may be suboptimal in some scenarios. In some cases, the techniques described herein may use a cluster tracker model to correct and/or detect potential erroneous detections of a 3D object detection model.

For example, consider an example scenario in which a vehicle has a bike rack attached to it. In this example scenario, the 3D object detection model may fail to detect that the bike rack and the vehicle are associated with the same 3D bounding area. This failure may be because of assumptions about vehicle shapes that fail to anticipate the bike rack attachment scenario and/or because of the absence of an adequate number of labeled 3D bounding areas corresponding to vehicles with bike racks in the training data used to train the 3D object detection model. Given this failure, the 3D object detection model may associate a region of the environment that includes the bike rack with a separate 3D bounding area (e.g., a 3D bounding area associated with a dynamic or static object) or with no 3D bounding areas. Both of these potential scenarios constitute an operational failure for the 3D object detection model and may lead to erroneous environment perception, object behavior prediction, and/or trajectory planning.

As another example, the 3D object detection model may rely on an assumption and/or a pattern observed in the training data that most vehicles have a roughly rectangular and/or elliptical shape. This assumption may be violated if, for example, a vehicle has building material extending longitudinally from the roof and/or rear and/or a vehicle has a roof rack cargo system. In such scenarios, the 3D object detection model may generate a 3D bounding area that fails to include at least a portion of the vehicle (e.g., a portion outside of a rectangular and/or elliptical region). The missing portion of the vehicle may be included in a different 3D bounding area and/or may be associated with no 3D bounding areas. For example, the missing portion may be characterized as part of a 3D bounding area associated with another dynamic object (e.g., a motorcycle) or with a static roadway object (e.g., a traffic light). Such erroneous object detection outputs may lead to erroneous environment perception, object behavior prediction, and/or trajectory planning.

In some cases, the techniques described herein include using a cluster tracker model to detect a cluster track based on sensor data associated with a vehicle environment. Determining the cluster track may include identifying, within the sensor data, clusters of sensor data points that move collectively across multiple sensor data frames captured across time. For example, a cluster track may be determined based on a group of lidar points that move together across multiple lidar frames captured as the vehicle moves through the environment. As another example, a cluster track may be determined based on a group of radar points that move together across multiple radar frames captured as the vehicle moves through the environment.

In some cases, the cluster tracker model is configured to: (i) receive sensor data associated with two or more times (e.g., a sequence of sensor data frames associated with a sequence of times), (ii) determine, based on the sensor data, a first point track and a second point track, (iii) determine, based on first movement data (e.g., velocity data, position change data, and/or the like) associated with the first point track and second movement data associated with the second point track, that the two point tracks move collectively, and/or (iv) based on determining that the two point tracks move collectively, determining a cluster track that includes the two point tracks. A point track may represent a set of sensor data points (e.g., lidar points) across a set of sensor data frames (e.g., lidar point clouds) that are detected to be associated with the same object in the environment. To detect a point track, the cluster tracker model may correlate sensor data points across frames based on similar characteristics such as spatial location, velocity, acceleration, shape, size, and/or the like. After a set of point tracks are detected, the cluster tracker model may process the movement of the point tracks across frames to determine if any subset of tracks are moving collectively. This collective movement may be determined based on similarities in movement information (e.g., velocities, trajectories, accelerations, and/or the like) associated with the point tracks. If a collective movement is detected, a cluster track may be determined based on the set of collectively moving point tracks.

In some cases, the cluster tracker model represents a cluster track with a distribution, such as a distribution determined based on an inverse Wishart distribution. For example, the cluster track may be represented with a multivariate Gaussian distribution $N(\mu, \Sigma)$, where u is the mean position of the cluster (e.g., the centroid of the cluster) and $\Sigma$ is a covariance matrix associated with the cluster track. The covariance matrix $\Sigma$ may represent the spatial spread and correlation of the points within the cluster track over time as represented by an inverse Wishart distribution. For example, in some cases, the parameters of the inverse Wishart distribution may initially be set based on initial assumptions about expected cluster shape. As new sensor data is collected for the cluster over time, Bayesian updating may be applied to refine the inverse Wishart distribution based on new cluster-related measurements as determined based on the new sensor data.

In some cases, the cluster tracker model is a multi-hypothesis tracker model that is configured to maintain one or more hypotheses (e.g., modes) about associations of point tracks with cluster tracks and/or about associations of points with point tracks. In some cases, each hypothesis maintained by the multi-hypothesis tracker model represents a hypothesis about one or more candidate cluster tracks that are determined in a set of sensor data frames. A candidate cluster track may represent a collection of point tracks that have been determined by the cluster tracker model but has not been selected as the output of the cluster tracker model. For example, a first hypothesis may represent that a first point track and a second point track are part of a common candidate cluster track, while a second hypothesis may represent that the two point tracks are part of different candidate cluster tracks.

In some cases, the multi-hypothesis tracker model generates a hypothesis score for each hypothesis that represents a likelihood that a candidate cluster track represented by the hypothesis includes a set of point tracks that move collectively and/or that are associated with a common object in the environment. The hypothesis score for a hypothesis may be generated based on at least one of: (i) how much a particular sensor data frame (e.g., a latest sensor data frame) supports an arrangement of allocating point tracks to candidate cluster tracks, (ii) how much one or more previous sensor data frames support the arrangement. In some cases, the multi-hypothesis tracker model may be configured to: (i) receive a set of hypotheses generated in relation to a sensor data frame and/or a set of sensor data frames, (ii) generate a score for each of the hypotheses, and (iii) determine whether to select a subset of the hypotheses based on the generated hypothesis scores. In some cases, the multi-hypothesis tracker model continues to maintain multiple hypotheses about clustering point tracks until the hypothesis score for a hypothesis satisfies a threshold (e.g., a threshold determined based on a distribution of hypothesis scores associated with the multiple hypotheses) and that hypothesis is selected. Afterward, the candidate cluster tracks corresponding to the selected hypotheses are selected as the set of cluster tracks output by the multi-hypothesis detection model. In some cases, the different hypotheses are determined based on sensor data from different sensor modalities.

In some cases, a hypothesis is associated with a set of cluster tracks determined in at least a portion of an environment (e.g., a region of interest (ROI) within the environment). In some cases, the hypothesis score generated for a hypothesis by the multi-hypothesis tracker model may represent a global score reflecting the overall quality of a candidate clustering arrangement. In some cases, the hypothesis score indicates the likelihood that the hypothesized clustering of point tracks accurately captures the collective motion patterns across a region of the environment. For example, the score may represent how well the set of clustered tracks determined under that hypothesis matches the motion and connectivity of sensor data points within a region of interest. In some cases, since a hypothesis score reflects the aggregate alignment between the hypothesized clustering arrangement associated with and the sensor data, the score functions as a global score associated with clustering a portion of the sensor data into a set of collective tracks. This global scoring of clustering hypotheses may enable the multi-hypothesis tracker to evaluate and compare different possible groupings of tracks to determine the highest quality clustering given the sensor observations.

For example, consider an environment in which a first sedan vehicle partially occludes perception of a second sedan vehicle at a first time and no longer blocks perception of the second vehicle at a second time. In this example, based on sensor data associated with the first time, the multi-hypothesis tracker model may generate a first hypothesis that associates the perceived region with a single cluster track and a second hypothesis that associates the perceived region with two cluster tracks. The multi-hypothesis tracker model may be unable to select one hypothesis based on the sensor data associated with the first time. However, after processing the sensor data associated with the second time, the multi-hypothesis tracker model may increase the hypothesis score associated with the second hypothesis and/or decrease the hypothesis score associated with the first hypothesis. Subsequently, the multi-hypothesis tracker model may be configured to select the second hypothesis and output the two cluster tracks as the output of the multi-hypothesis tracker model.

In some cases, a hypothesis (e.g., a "mode") of the multi-hypothesis tracker represents one or more distributions about one or more predicted parameters associated with one or more candidate trackers associated with the vehicle environment. For example, a hypothesis may include physical parameters such as object position, orientation, velocity, acceleration, and/or the like. The parameters may also, or instead, include non-physical parameters such as object classification, object labels, and/or the like. In some cases, each hypothesis is associated with a Gaussian distribution and the set of hypotheses may thus represent a set of distributions (e.g., a mixture model, such as a Gaussian mixture model). In some cases, the set of hypotheses correspond to a mixture model in which each hypothesis is associated with a distribution over the parameters and a probability (e.g., a probability determined based on the hypothesis score associated with the hypothesis). Example techniques for using mixture models for multi-hypothesis clustering are described in U.S. patent application Ser. No. 18/087,601, entitled "Determining Object Orientation Based on Parameter Modes," filed on Dec. 22, 2022, which is incorporated herein by reference in its entirety and for all purposes.

In some cases, to determine cluster tracks, the cluster tracker model uses clustering using connectivity patterns in a voxel space determined based on the sensor data associated with the vehicle environment. In some cases, the sensor data can be processed into a three-dimensional voxel grid surrounding the vehicle. The sensor points may be discretized into voxels in this 3D space based on their coordinates. The cluster tracker model may then process connectivity between occupied voxels in this 3D space. Voxels that are spatially proximate and connected above some threshold may be identified as belonging to the same candidate cluster. This connectivity may be determined using 3D image processing techniques like 3D morphing. Afterward, candidate clusters determined across two or more sensor data frames may be processed to detect which voxel connectivity patterns persistent across the frames. Voxels that maintain connectivity over time may be identified as belonging to candidate cluster tracks.

In some cases, to cluster point tracks, point tracks are mapped to a multi-dimensional clustering space, and a clustering algorithm is applied to the multi-dimensional clustering space. Examples of clustering algorithms that may be used include hierarchical clustering and Density-Based Spatial Clustering of Applications with Noise (DBSCAN) clustering. The multi-dimensional clustering space may be characterized by dimensions corresponding to point track features like average velocity, trajectory, acceleration, and/or the like.

In some cases, the cluster tracker model applies a segmentation algorithm to divide the sensor data associated with a sensor data frame into clusters of sensor points. The detected segments from individual frames may then be correlated across frames to determine segment tracks, based on sets of segments across multiple frames that are predicted to correspond to the same object. In some cases, segment tracks that have collective motion may be identified as candidate cluster tracks.

In some cases, unlike the 3D object detection model, the cluster tracker model is an assumption-free model that does not integrate explicit or implicit assumptions about object features such as object shapes, movement patterns, velocity patterns, and/or the like. Instead, the cluster tracker model may be focused on capturing collective movement patterns across sensor data frames. Accordingly, the cluster tracker model may generate tracking outputs that do not suffer from shortcomings of the 3D object detection model relating to deviations from expected feature patterns (e.g., expected shape patterns). However, in some cases, the cluster tracker model may be more computationally expensive to execute than the 3D object detection model. This may be because the cluster tracker model relies on processing large volumes of sensor data points across frames rather than leveraging assumptions and/or trained machine learning models applied on entire sensor data frames and/or sensor data frame sets to reduce the processing load. For example, to detect collective motion patterns, the cluster tracker may be configured to correlate and analyze relationships between a large number of sensor points across multiple frames. This may involve significant use of computational resources. In contrast, in some cases, by using assumptions about expected object features and motion, the 3D object detection model may be configured to operate more efficiently, but at the risk of errors when assumptions are violated. The computational load associated with the cluster tracker model may further increase if the cluster tracker model uses multiple-hypothesis tracking, which may require maintaining two or more cluster tracking hypotheses over time.

In some cases, to use the superior accuracy of the cluster tracker model (e.g., under at least some scenarios) to correct and/or detect errors associated with the 3D object detection model while limiting the computational inefficiencies associated with the cluster tracker model, an example system uses the 3D object detection model to limit the scope of the cluster tracking operations performed by the cluster tracker model. For example, in some cases, after the 3D object detection models determines a set of 3D bounding areas within a sensor data frame, the cluster tracker limits operations performed to detect cluster tracks to a region of the environment that is determined based on the locations of the 3D object detection models. In some cases, after receiving a 3D bounding area determined by the 3D object detection model, the cluster tracker model determines a region of interest around the 3D bounding area. For instance, the region of interest around a bounding area may be defined as an area 50-100% larger than the bounding area dimensions. In some cases, only sensor data points within this region of interest are processed by the cluster tracker. This may significantly reduce the number of data points processed by the cluster track model and thus the computational complexity of performing operations associated with that model.

In some cases, the cluster tracker model may: (i) receive a 3D bounding area within a sensor data frame determined by the 3D object detection model, (ii) determine regions of interest associated with the 3D bounding area within a set of sensor data frames, (iii) determine point tracks within the regions of interest, and (iv) cluster the point tracks that move collectively to identify cluster tracks. In some cases, the number of frames processed by the cluster tracker model may be limited to a temporal range around frames where the 3D object detector identified objects. For example, clustering may be applied to frames within 0.5 seconds before and after a sensor data frame within which a 3D bounding area is detected, rather than across all frames. This focused application of cluster tracking across a subset of sensor data frames may further reduce computational workload.

In some cases, the techniques described herein include determining that a 3D bounding area detected by the 3D object detection model and a cluster track detected by the cluster tracker model are related. This determination may be made based on overlap between the 3D bounding area and the cluster track. For example, if a large percentage (e.g., over 50%) of the points included in a cluster track are also included in a 3D bounding area, it may be determined that the 3D bounding area and the cluster track are related. As another example, if the centroid of a cluster track is included in a 3D bounding area, it may be determined that the 3D bounding area and the cluster track are related.

In some cases, determining that a 3D bounding area and a cluster track are related includes determining an association score associated with the 3D bounding area and the cluster track. The association score may be based on factors such as the overlap between the 3D bounding area and cluster track, the distances between their respective centroids, similarities in their estimated velocities and/or trajectories, and/or the like. If the association score associated with the 3D bounding area and the cluster track exceeds a predetermined threshold, it may be determined that the 3D bounding area and cluster track are related. In some cases, the association score associated with a 3D bounding area and a cluster track may represent the alignment between one or more features (e.g., determined based on velocities, positions, trajectories, and/or the like) of the 3D bounding area and the cluster track over one or more periods of times. In some cases, the association score associated with a 3D bounding area and a cluster track may be updated over time as new sensor data is received.

In some cases, determining associations between 3D bounding areas and cluster tracks may be performed using a multi-hypothesis association model. In some cases, the multi-hypothesis association model maintains multiple hypotheses about how the detected 3D bounding areas are related to the detected cluster tracks. The multi-hypothesis association model may represent each hypothesis as a candidate association set that specifies a different proposed assignment of bounding areas to cluster tracks. The multi-hypothesis association model may evaluate each candidate association set and generates a score reflecting the likelihood that the proposed associations are correct. Scores may be generated based on the overlaps between bounding areas and cluster tracks, the similarities of motion patterns, the relative positions and orientations, and whether associations maintain temporal continuity. Based on the association scores, low-scoring hypotheses may be pruned over time. Once a hypothesis achieves a high enough score, the proposed associations may be selected as the output of the multi-hypothesis association model.

In some cases, the techniques described herein may include determining a mismatch region between a 3D bounding area and a cluster track. In some cases, after it is determined that a 3D bounding area and a cluster track are related, an example system may determine a mismatch region between the 3D bounding area and the cluster track. The mismatch region may represent a portion of the cluster track that is not covered or included in the 3D bounding area. For example, consider a scenario where a 3D bounding area covers most but not all of a vehicle with a bike rack attached. In this example, the points associated with the bike rack may form a mismatch region that is part of the cluster track detected for the vehicle, but not part of the 3D bounding area detected for the vehicle. As another example, if a 3D bounding area corresponds to a vehicle with a rectangular shape, but the actual vehicle has a non-rectangular protrusion, the cluster track may include points associated with the missing protrusion while the 3D bounding area does not. In this example, the points associated with the protrusion may represent a mismatch region.

In some cases, determining the mismatch region includes processing the cluster track to identify clusters of points that are not included in the 3D bounding area. In some cases, an example system may use a segmentation technique such as connected component labeling to determine the mismatch region. For example, in some cases, the system may process the cluster of point tracks associated with the track using connected component labeling to find contiguous groups of point tracks. Each resulting segmented region may then be compared against the 3D bounding area. Segments that do not spatially overlap with the bounding area may be identified as candidate mismatch regions and/or as mismatch regions.

In some cases, the techniques described herein include updating the 3D bounding area to include a second 3D bounding area corresponding to the mismatch region. For example, the coordinates of the mismatch region may be processed to determine a new 3D bounding area that covers the mismatch region. This new 3D bounding area may then be merged with the original 3D bounding area to determine an updated 3D bounding area. Accordingly, in some cases, by using the cluster tracker model to detect regions missed by detections of the 3D object detection model, an updated 3D bounding area may be generated that provides a more complete and accurate representation of an object in the vehicle environment. This improved object perception may enhance the vehicle's ability to safely navigate and operate autonomously. The updated 3D bounding areas may be provided as outputs to downstream components of the vehicle computing system. For instance, the updated 3D bounding areas may be used by a prediction component of the vehicle computing device to predict object trajectories and behaviors more accurately. A motion planning component may also use the updated 3D bounding areas to plan safer and more efficient driving paths and maneuvers.

In some cases, if a mismatch measure determined based on the mismatch region exceeds a threshold, an example system may provide a signal to a trajectory validation component of the vehicle computing device. The signal may cause the trajectory validation component to execute one or more failover maneuvers. Examples of failover maneuvers include maneuvers including stopping the vehicle, slowing down, pulling to the shoulder of the road and/or another safe region, triggering manual control of an autonomous vehicle, and/or the like. In some cases, the mismatch measure may represent a measure of deviation between the 3D bounding area as originally determined and the related cluster track. For example, the mismatch measure may represent a measure of size of the mismatch region. As another example, the mismatch measure may represent the percentage of cluster track points outside the 3D bounding area. As another example, the mismatch measure may represent the total number of disjoint segmentation regions identified as mismatch regions across a period of time.

In some cases, an example system may use cluster tracks to generate training data for training the 3D object detection model. For example, in some cases, updated 3D bounding areas associated with sensor data frames may be used to generate labels associated with new training samples used for training the 3D object detection model. Retraining the 3D object detection model using this additional training data may make the model more robust against deviations in expected patterns and/or assumptions. In some cases, an example system may provide the mismatch regions identified by comparing 3D bounding areas and cluster tracks to one or more users (e.g., one or more developers of the 3D bounding area model) to potentially modify the architecture and/or the assumptions of the 3D object detection model to accommodate past errors associated with that model, as determined based on the cluster tracks determined by the cluster tracking model.

In some cases, the techniques discussed herein can be implemented to facilitate and/or enhance safety of automated navigation features in vehicles, such as in automated vehicles or semi-automated vehicles. For example, the techniques can be used to determine a trajectory for an autonomous vehicle and control the autonomous vehicle based on the trajectory. As another example, the techniques can be used to determine that a current trajectory of a vehicle is likely to collide with an object that is within the environment of the vehicle. Upon determining that the current trajectory is likely to collide with an object, the driver of the vehicle may be stopped from following the current trajectory and/or the driver of the vehicle may be alerted upon the likelihood of collision. In some cases, upon determining that the current trajectory of an autonomous vehicle is likely to collide with an object in the autonomous vehicle environment, the driver of the autonomous vehicle may be alerted to exercise manual control of the autonomous vehicle.

In some cases, the techniques described herein improve computational efficiency of performing cluster tracking. In some cases, by using the 3D object detection model to focus the scope of operations performed by the more computationally expensive cluster tracker model, the overall workload required for object detection may be reduced. For example, limiting cluster tracking to regions of interest around bounding areas output by the 3D detector reduces the number of sensor data points and sensor data frames that the cluster tracker model may be tasked to process. This may significantly lower the processing and memory resources needed relative to globally applying cluster tracking across all frames.

In some cases, the techniques described herein improve the safety of a vehicle's navigation. In some cases, by using cluster tracking to update 3D bounding areas, the techniques described herein may enhance safety of vehicle navigation. Without correcting bounding areas, leftover portions of objects outside the bounding areas may be wrongly labeled as separate static or dynamic objects. For example, a protruding bike rack may be detected as a distinct object, or an extra cargo attachment may be detected as a new vehicle. Such improper object detections may lead to inaccurate perception and planning outputs. However, by using cluster tracking to update 3D bounding areas, detection accuracy may be improved. This may reduce the chances of vehicle attachments and/or protrusions being perceived as additional obstacles, which may trigger unnecessary evasive actions and/or cause collisions. In some cases, updating bounding areas to fully encapsulate objects based on cluster tracks enables the vehicle to recognize object boundaries precisely and plan accordingly. This allows the vehicle to safely navigate around full object extents.

In some cases, the techniques described herein enable performing enhanced object tracking by multi-hypothesis association-free cluster tracking in real-time and on a vehicle computing device. In some cases, because multi-hypothesis association-free cluster tracking is computationally resource intensive, performing multi-hypothesis association-free cluster tracking on entire sensor data in real-time and on a vehicle computing device may not be feasible. However, limiting cluster tracking to regions of interest around bounding areas output by the 3D detector reduces the workload of the cluster tracker model, which increases the likelihood that the operations of that model can be performed in real-time and on a vehicle computing device. In some cases, the computational complexity of multi-hypothesis cluster tracking algorithms scales with the number of data points processed across frames. By constraining the scope of points provided to the cluster tracker model based on the 3D detector model outputs, the overall number of operations performed by the cluster tracker model. This may enable the vehicle computing system to accommodate the stream of incoming sensor data in real-time.

In some cases, the techniques described herein enable dynamic adjustment of operational load of a cluster tracker model based on processing capacities. For example, in some cases, the size of regions of interest around 3D bounding areas may be varied based on current processing constraints. In heavier load scenarios, region size may be decreased to maintain real-time speeds. In lighter load scenarios, region size may be increased to take advantage of extra resources. This flexibility may further enhance the efficiency and/or effectiveness of multi-hypothesis cluster tracking for performing perception operations associated with autonomous and/or semi-autonomous navigation.

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using computer vision and/or perception techniques and are not limited to vehicles. Further, the methods, apparatuses, and systems may be utilized to perform computer vision operations on three-dimensional image or on sensor data other than image data (e.g., lidar frames, radar frames, depth camera frames, etc.). Moreover, although various computer vision operations are described as being performed by a perception component of a vehicle computing device, a person of ordinary skill in the relevant technology will recognize that the perception component may be deployed on other computing devices, such as on a remote computing device that communicates with a vehicle computing device using a networked connection.

FIG. 1 is a flowchart diagram of an example process 100 for determining a 3D bounding area using a 3D object detection model and a cluster tracker model. As depicted in FIG. 1, at operation 102, the process 100 includes determining a first 3D bounding area in a sensor data frame using a 3D object detection model. In some cases, the 3D object detection model may use statistical assumptions about expected object shapes and/or movement patterns to process sensor data to determine a 3D bounding area that is predicted to depict an object in the vehicle environment. In some cases, the 3D object detection model may use a machine learning model, such as a machine learning model configured to process a sensor data frame (e.g., a lidar point cloud) to determine data representing the position of an object in the environment and/or a classification associated with the object.

As depicted in FIG. 1, the sensor data frame 110 (e.g., a lidar point cloud, an image, a radar point cloud, and/or the like) represents sensor data associated with a vehicle's environment at a particular time. FIG. 1 also detects that the 3D object detection model has processed the sensor data frame 110 to determine the 3D bounding area 112. The 3D bounding area 112 may be associated with an object track detected by the 3D object detection model across a set of times.

As depicted in FIG. 1, the 3D bounding area 112 include sensor data representing a pedestrian but does not include sensor data representing a bag that the pedestrian is holding. This may be because statistical assumptions of the 3D object detection model do not associate a pedestrian with a shape that accommodates the pedestrian holding a bag. Alternatively, or additionally, the lack of inclusion of sensor data associated with the bag in the 3D bounding area 112 may result from absence of substantial and/or sufficient training data in which a pedestrian holding a bag is labeled in association with a labeled bounding area that includes both the pedestrian and the bag.

At operation 104, the process 100 includes determining a cluster track that is related to the 3D bounding area. In some cases, determining a cluster track that is related to a 3D bounding area includes: (i) determining a cluster of point tracks in the sensor data associated with the vehicle environment that are determined to move collectively, and/or (ii) determining that the cluster relates to the 3D bounding area.

To determine the cluster of point of tracks that move collectively, a cluster tracker model may be configured to: (i) receive a set of sensor data frames associated with a set of times, (ii) determine a set of point tracks in the set of sensor data frames, (iii) for each point track, determine movement data (e.g., velocity data, position shift data, and/or the like) associated with the movement of the point track in the environment across the set of sensor data frames, and/or (iv) based on the movement data, determine a subset of point tracks that move collectively and designate the subset as a cluster track. A point track may represent a set of sensor data points (e.g., lidar points) across a set of sensor data frames (e.g., lidar point clouds) that are detected to be associated with the same object in the environment.

For example, as depicted in FIG. 1, the cluster tracker model processes the sensor data frame 110 and the sensor data frame 114 (e.g., a subsequent sensor data frame associated with a subsequent time relative to the time associated with the sensor data frame 110) to determine the cluster track 116. As depicted in FIG. 1, the cluster track 116 includes sensor data representing the pedestrian including the sensor data representing the bag that the pedestrian is holding. This may be because the cluster tracker model is an assumption-free model that does not make any assumptions about object shapes and/or movement patterns. Instead, the cluster tracker model may determine that the sensor data representing the bag is part of the cluster track 116 because the sensor data associated with the pedestrian's body and the sensor data representing the bag move collectively.

In some cases, rather than globally clustering all data points across all sensor data frames, the cluster tracker model operates on detections not assigned by the 3D object detection model and/or areas around existing 3D bounding areas. For example, after the 3D detection model assigns 3D bounding areas, any remaining unassigned sensor data near the bounding areas may be processed by the cluster tracker model. The cluster tracker may also cluster points within a proximity radius around each bounding area to validate object detections made by the existing 3D bounding areas. In some cases, this selective application of clustering reduces computations compared to exhaustive clustering of all data. In some cases, if an object is detected by the 3D object detection model but not by the cluster tracker model, the detection is marked as a false-positive which may be used to generate new training data for the 3D object detection model. In examples, the clustering may be applied to areas that the 3D object detection model was unable to classify or classify or classify in certain ways (e.g., as debris or as unknown).

In some cases, the cluster tracker model may determine a cluster track by processing sensor data in a region of interest determined based on a position of the first 3D bounding area within the environment. In some cases, after determining the first 3D bounding area and the cluster track, an example system determines whether the first 3D bounding area and the cluster track are related. In some cases, the system may determine whether the determined cluster track is related to the first 3D bounding area based on the amount of overlap between the cluster track points and the first bounding area. For example, if a high percentage of points in the cluster track are within the first bounding area, it may be determined that the cluster track and 3D bounding area are related.

At operation 106, the process 100 includes determining a mismatch region associated with the cluster track and the first 3D bounding area. The mismatch region may be a region of the cluster track that is outside the first 3D bounding area. In some cases, an example system may use one or more segmentation techniques to identify clusters of points in the cluster track that do not spatially overlap with the first 3D bounding area and designate at least a subset of that point cluster as the mismatch region.

For example, as depicted in FIG. 1, the example system has processed the first 3D bounding area 112 and the cluster track 116 to determine that the mismatch region 118 that is covered by the cluster track 116 but not the first 3D bounding area 112 (e.g., that is part of the cluster track 116 but not the first 3D bounding area 112). As depicted in FIG. 1, the mismatch region 118 includes sensor data associated with the bag being held by the pedestrian, as sensor data associated with the bag was included in the cluster track 116 but not the first 3D bounding area 112 (e.g., due to assumptions and/or inferred shape patterns associated with the 3D object detection model).

At operation 108, the process 100 includes updating the first 3D bounding area to include the mismatch region identified in operation 106. For example, the coordinates of the mismatch region may be processed to determine a second 3D bounding area that covers the mismatch region. This second 3D bounding area may then be combined with the first 3D bounding area to generate an updated 3D bounding area that more fully encapsulates the detected object. This updated 3D bounding area may be provided to downstream components of the vehicle computing system for further processing.

For example, as depicted in FIG. 1, the example system has updated the first 3D bounding area 112 to include the mismatch region 118. Accordingly, the updated 3D bounding area 120 includes both the sensor data associated with the pedestrian and the sensor data associated with the 3D object detection model. In this way, integrating the mismatch region 118 into the first 3D bounding area 112 may enhance the accuracy of the object detection performed by the 3D object detection model.

Figure 2:
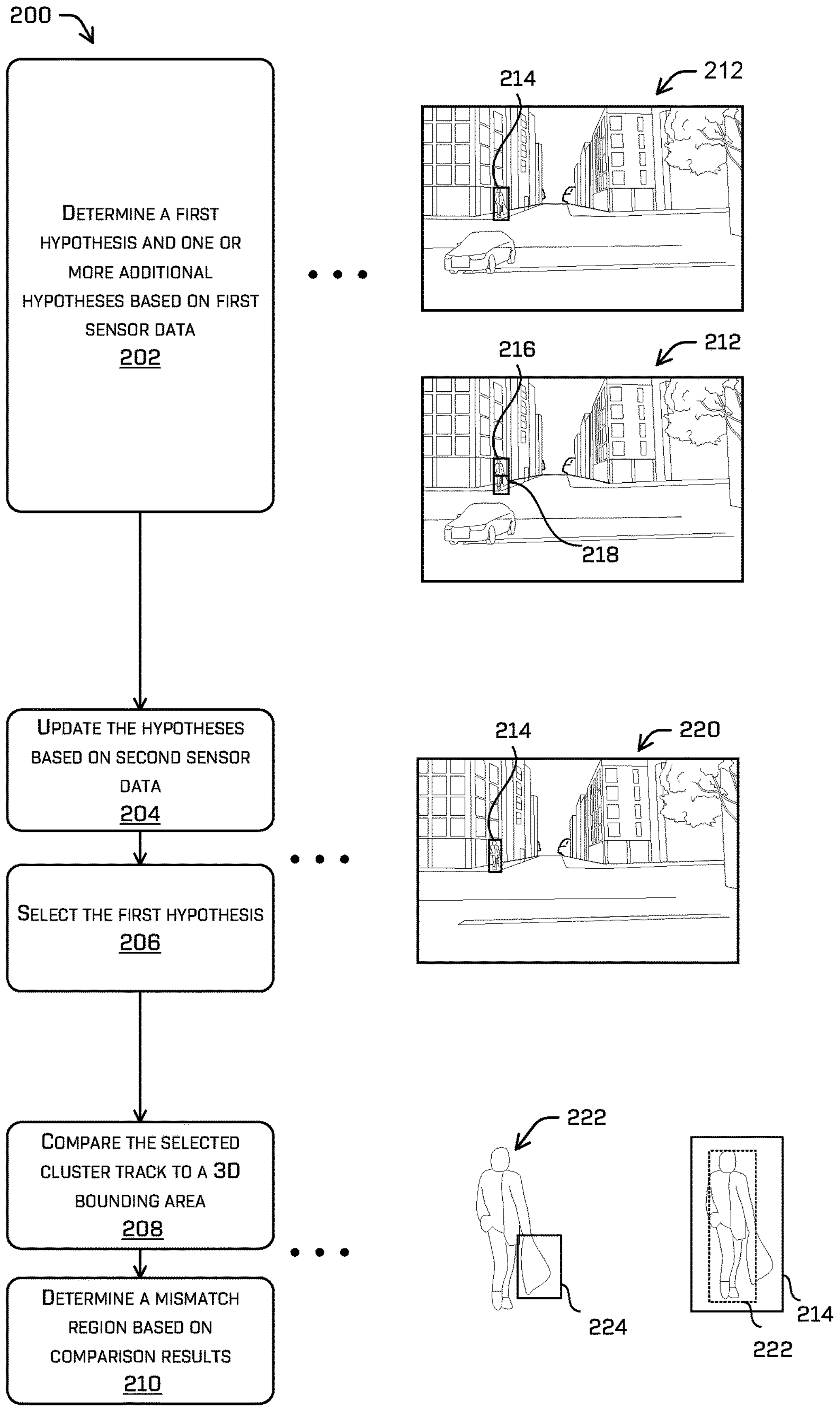
FIG. 2 is a flowchart diagram of an example process for determining a mismatch region based on a cluster track determined using multi-hypothesis cluster tracking.

FIG. 2 is a flowchart diagram of an example process 200 for determining a mismatch region based on a cluster track determined using multi-hypothesis cluster tracking. As depicted in FIG. 2, at operation 202, the process 200 includes determining a first hypothesis representing one or more first candidate cluster tracks and a second hypothesis representing one or more second candidate cluster tracks based on first sensor data.

In some cases, a multi-hypothesis cluster tracker model processes first sensor data associated with a vehicle environment at a first time. Based on the first sensor data, the multi-hypothesis cluster tracker generates two hypotheses about potential cluster tracks in the environment. The first hypothesis represents a first candidate cluster track comprising a first set of point tracks that collectively move across the first sensor data. The second hypothesis represents a second candidate cluster track comprising a second set of point tracks that collectively move across the first sensor data.

In some cases, for each hypothesis, the multi-hypothesis cluster tracker determines an initial hypothesis score reflecting the likelihood that the hypothesized cluster track accurately reflects collective motion patterns in the first sensor data. Accordingly, the multi-hypothesis cluster tracker generates a first hypothesis score for the first hypothesis and a second hypothesis for the second hypothesis.

For example, as depicted in FIG. 2, the first sensor data may include a first sensor data frame 212. As further depicted in FIG. 2, the first sensor data frame 212 is used to determine two hypotheses: a first hypothesis that hypothesizes that the point tracks corresponding to a pedestrian's body are part of a common cluster track 214, and a second hypothesis that hypothesizes that the point tracks corresponding to the pedestrian's body are part of two cluster tracks: cluster track 216 and cluster track 218.

At operation 204, the process 200 includes updating the hypothesis scores for the two hypotheses based on second sensor data. In some cases, after processing the first sensor data, the multi-hypothesis cluster tracker receives second sensor data associated with the vehicle environment at a second, later time. The multi-hypothesis cluster tracker may evaluate how well each hypothesis matches collective motion patterns in the new second sensor data. Based on this evaluation, the hypothesis scores are updated to reflect how much the new data supports each hypothesis. For example, the second sensor data may provide clearer perception that increases support for the first hypothesis and decreases support for the second hypothesis. Thus, the score for the first hypothesis would be increased while the score for the second hypothesis would be decreased based on the second sensor data.

For example, as depicted in FIG. 2, the second sensor data may include a second sensor data frame 220. As depicted in FIG. 2, the second sensor data frame 220 depicts that the points associated with cluster track 214 move collectively. Accordingly, the second sensor data frame 220 may cause the hypothesis score for the first hypothesis to be increased and/or the hypothesis score for the second hypothesis to be decreased.

At operation 206, the process 200 includes selecting the first hypothesis based on the updated hypothesis scores. In some cases, after hypothesis scores are updated based on the second sensor data, the multi-hypothesis cluster tracker selects one of the hypotheses based on the updated scores. In this example, the first hypothesis may be selected because its hypothesis score increased to be higher than the second hypothesis score after processing the second sensor data. Accordingly, candidate cluster track represented by the selected first hypothesis may be output as the cluster track detected by the multi-hypothesis cluster tracker.

At operation 208, the process 200 includes comparing the first cluster track to a 3D bounding area. In some cases, the cluster track represented by the selected first hypothesis is compared to a 3D bounding area that was detected by a separate 3D object detection model (e.g., based on at least one of the first sensor data or the second sensor data). For example, as depicted in FIG. 2, the cluster track 214 is compared with the 3D bounding area 222.

At operation 210, the process 200 includes determining a mismatch region based on comparing the first cluster track and the 3D bounding area. In some cases, the mismatch region represents a portion of the first cluster track that does not spatially overlap with the 3D bounding area. For example, the 3D bounding area may fail to encapsulate a protrusion and/or attachment on an object that is captured by the second cluster track. The points corresponding to that protrusion and/or attachment may be part of the mismatch region. For example, as depicted in FIG. 2, the result of comparing the cluster track 214 and the 3D bounding area 222 is the mismatch region 224.

Figure 3:
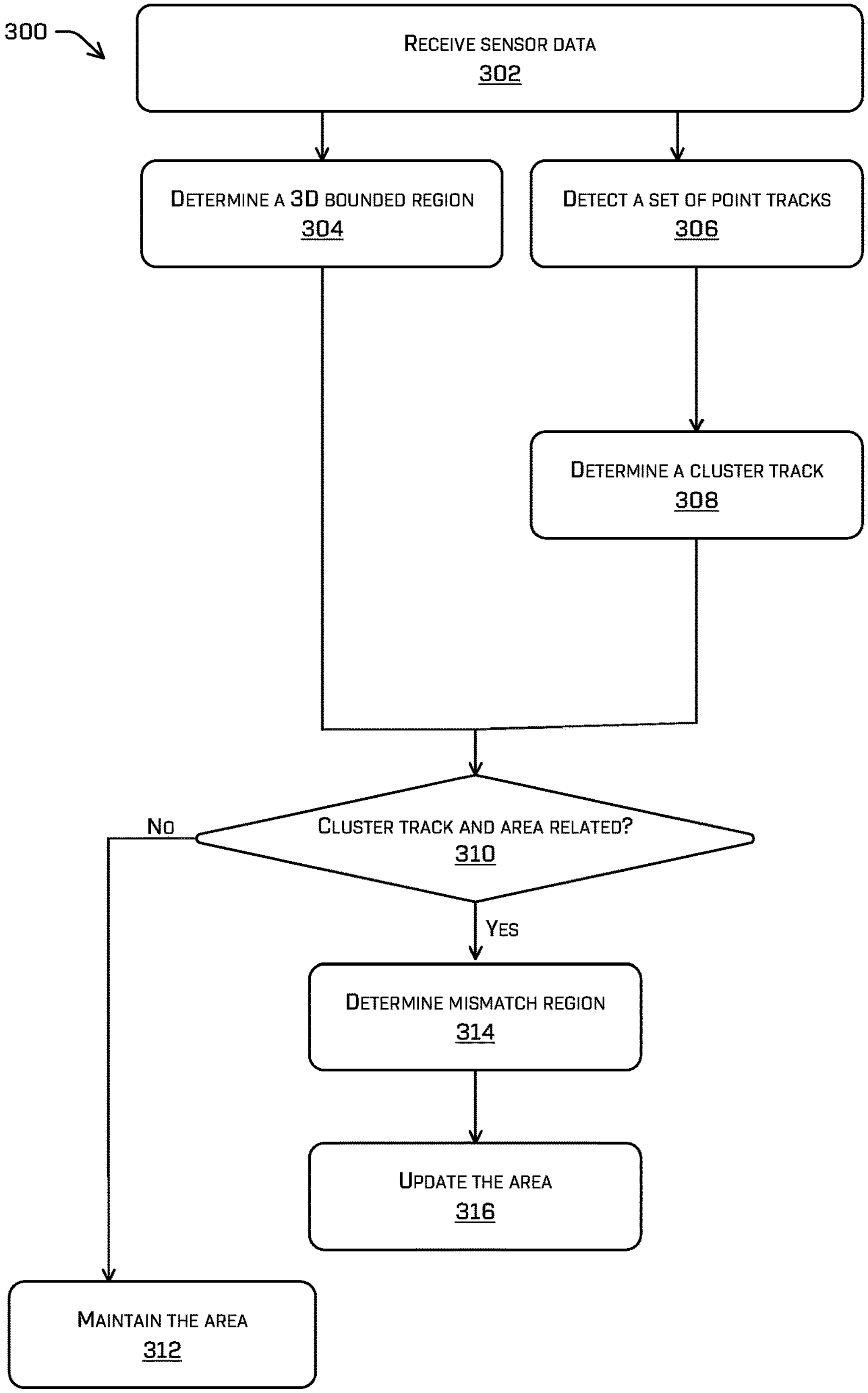
FIG. 3 is a flowchart diagram of an example process for updating a 3D bounding area based on a cluster track.

FIG. 3 is a flowchart diagram of an example process 300 for updating a 3D bounding area based on a cluster track. As depicted in FIG. 3, at operation 302, an example system receives sensor data associated with a vehicle environment. The sensor data may represent data determined based on the output of one or more sensors, such as one or more lidar sensors, one or more radar sensors, one or more cameras, and/or the like. In some cases, the sensor data represents one or more objects detected based on the output of one or more sensors.

At operation 304, the example system determines a 3D bounding area based on the sensor data. In some cases, a 3D object detection model processes the received sensor data to detect objects and determine 3D bounding areas representing those objects in the environment. For example, the 3D detector may identify a 3D bounding box and/or a 3D track associated with a vehicle detected based on patterns in sensor data points.

At operation 306, the example system detects a set of point tracks based on the sensor data. In some cases, point tracks include sets of sensor points that are associated with the same object over time. The point tracks may be determined by tracking the motion of various sensor data points across sensor data frames. In some cases, to detect a point track, the system may correlate sensor data points across frames based on similar characteristics such as spatial location, velocity, acceleration, shape, size, and/or the like.

At operation 308, the example system determines a cluster track based on at least a subset of the detected point tracks. In some cases, after a set of point tracks are detected, the system may process the movement of the point tracks across frames to determine if any subset of tracks are moving collectively. This collective movement may be determined based on similarities in movement information (e.g., velocities, trajectories, accelerations, and/or the like) associated with the point tracks. If a collective movement is detected, a cluster track may be determined based on the set of collectively moving point tracks.

At operation 310, the example system determines whether the cluster track and the 3D bounding area are related. In some cases, determining that a 3D bounding area and a cluster track are related includes determining an association score associated with the 3D bounding area and the cluster track. The association score may be based on factors such as the overlap between the 3D bounding area and cluster track, the distances between their respective centroids, similarities in their estimated velocities and/or trajectories, and/or the like.

If the example system determines that the cluster track and the 3D bounding area are not related (operation 310—No), the example system proceeds to operation 312 to not modify the 3D bounding area based on the cluster track. However, if the example system determines that the cluster track and the 3D bounding area are related (operation 310—Yes), the example system proceeds to operation 314 to determine a mismatch region associated with the cluster track and the 3D bounding area. The mismatch region may represent a portion of the cluster track that is not covered or included in the 3D bounding area. In some cases, determining the mismatch region includes processing the cluster track to identify clusters of points that are not included in the 3D bounding area.

At operation 316, the example system updates the 3D bounding area based on the mismatch measure. For example, the coordinates of the mismatch region may be processed to determine a second 3D bounding area that covers the mismatch region. This second 3D bounding area may then be combined with the original 3D bounding area to generate an updated 3D bounding area that more fully encapsulates the detected object. This updated 3D bounding area may be provided to downstream components of the vehicle computing system for further processing.

Figure 4:
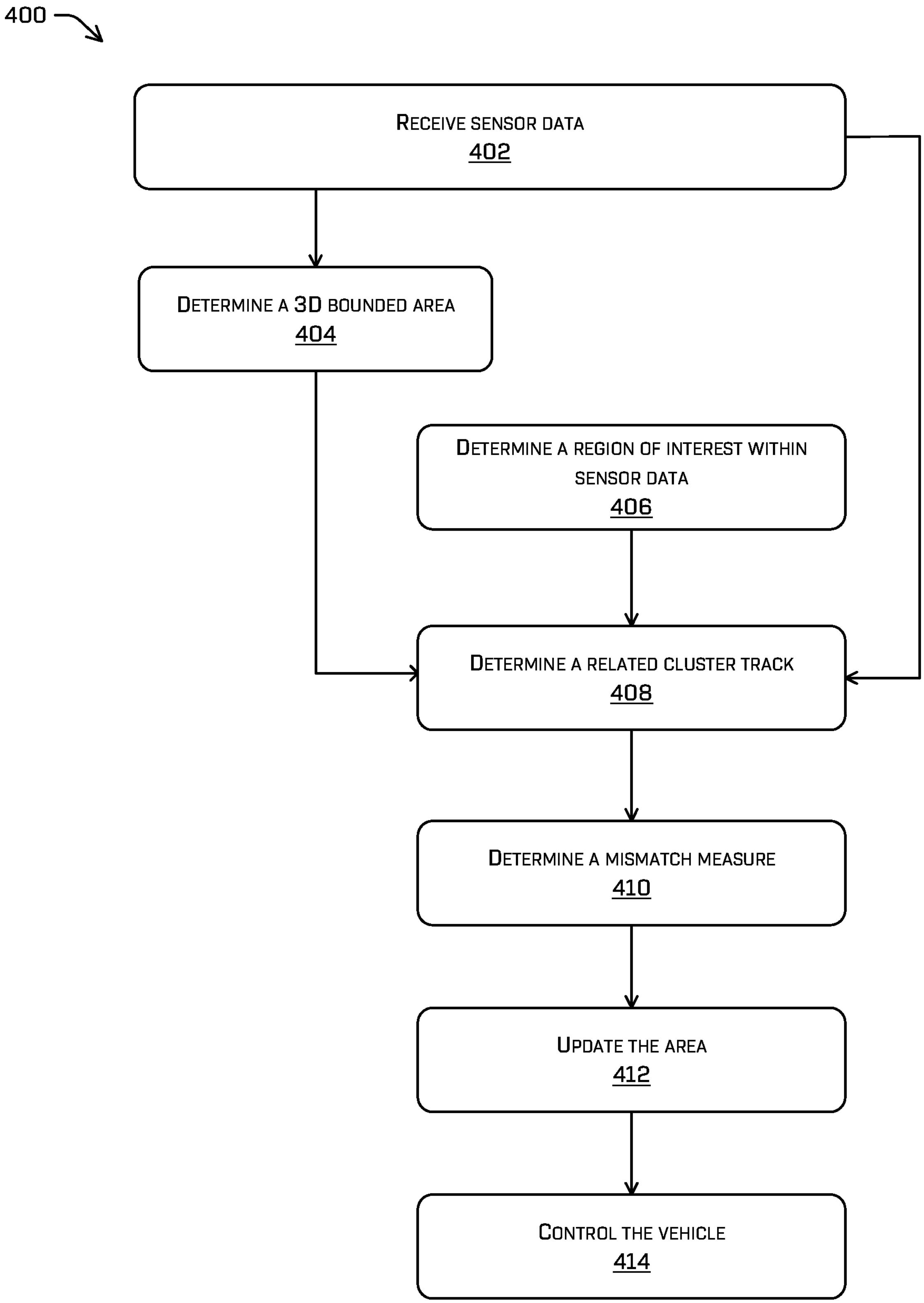
FIG. 4 is a flowchart diagram of an example process for controlling a vehicle based on a 3D bounding area and a cluster track associated with sensor data for the vehicle's environment.

FIG. 4 is a flowchart diagram of an example process 400 for controlling a vehicle based on a 3D bounding area and a cluster track associated with sensor data for the vehicle's environment. As depicted in FIG. 4, at operation 402, an example system receives sensor data associated with the vehicle environment. The sensor data may represent outputs from various sensors installed on the vehicle, such as lidar sensors, radar sensors, cameras, and/or the like. The sensor data may provide information about objects detected in the environment of the vehicle at one or more points in time. The sensor data may include one or more sensor data frames.

At operation 404, the example system determines a 3D bounding area within the sensor data using a 3D object detection model. The 3D object detection model may use patterns in the sensor data to detect objects of interest, like vehicles, pedestrians, cyclists, and/or the like. The 3D object detection model may output a 3D bounding area representing the estimated location of a detected object in the vehicle environment.

At operation 406, the example system determines a region of interest in the sensor data for determining one or more cluster tracks. The region of interest may include a corridor in front of or along a trajectory of the vehicle, where the corridor may have a predefined width. The region of interest may include a portion of a roadway determined based on a mission and/or trajectory associated with the vehicle. The region of interest can be used to reduce computational overhead dealing with cluster tracking (and/or multi-hypothesis cluster tracking). As such, the region of interest may adapt to focus on areas where it may be most beneficial. This may be determined based on a speed or maneuver of the vehicle. It may be characterized based on historic data of which areas are of higher risk to a vehicle given the preceding or other parameters. In some examples, a machine-learned model may be used to determine which areas the cluster tracking should be applied to. Parameters may also include an operational design domain of the vehicle (e.g., an urban setting vs a rural one), a time of day, weather conditions, and/or map data.

The region of interest may be defined as an area surrounding the 3D bounding area, such as 50% greater in size than the bounding area. Limiting analysis to the region of interest may reduce computational load associated with cluster tracking relative to applying the cluster tracking model globally to the full sensor data.

At operation 408, the example system determines a cluster track within the region of interest that is related to the 3D bounding area. To determine a cluster track, a cluster tracking model may determine groups of sensor points that move collectively across frames of sensor data. In some cases, the cluster tracker model may determine a cluster track by processing sensor data in a region of interest determined based on a position of the first 3D bounding area within the environment. In some cases, after determining the first 3D bounding area and the cluster track, an example system determines whether the first 3D bounding area and the cluster track are related. In some cases, the system may determine whether the determined cluster track is related to the first 3D bounding area based on the amount of overlap between the cluster track points and the first bounding area. For example, if a high percentage of points in the cluster track are within the first bounding area, it may be determined that the cluster track and 3D bounding area are related. In some cases, determining that the cluster track and the 3D bounding area are related is based at least in part on the estimated locations of the cluster track and the 3D bounding area within the environment.

At operation 410, the example system determines a mismatch region associated with the related 3D bounding area and cluster track. The mismatch region may represent a portion of the cluster track that falls outside the 3D bounding area. For example, the 3D bounding area may fail to encapsulate a protrusion on the object that is captured by the cluster track. The protrusion points may be designated as the mismatch region.

At operation 412, the example system updates the 3D bounding area based on the mismatch region. For example, the coordinates of the mismatch region may be processed to determine a second 3D bounding area that covers the mismatch region. This second 3D bounding area may then be combined with the first 3D bounding area to generate an updated 3D bounding area that more fully encapsulates the detected object.

At operation 414, the example system controls the vehicle based on the updated 3D bounding area. The updated 3D bounding areas may be provided as outputs to downstream components of the vehicle computing system. For instance, the updated 3D bounding areas may be used by a prediction component of the vehicle computing device to predict object trajectories and behaviors more accurately. A motion planning component may also use the updated 3D bounding areas to plan safer and more efficient driving paths and maneuvers. In some cases, controlling the vehicle based on the updated 3D bounding area includes determining a trajectory that avoids an area associated with the mismatch region and controlling the vehicle based on the trajectory.

Figure 5:
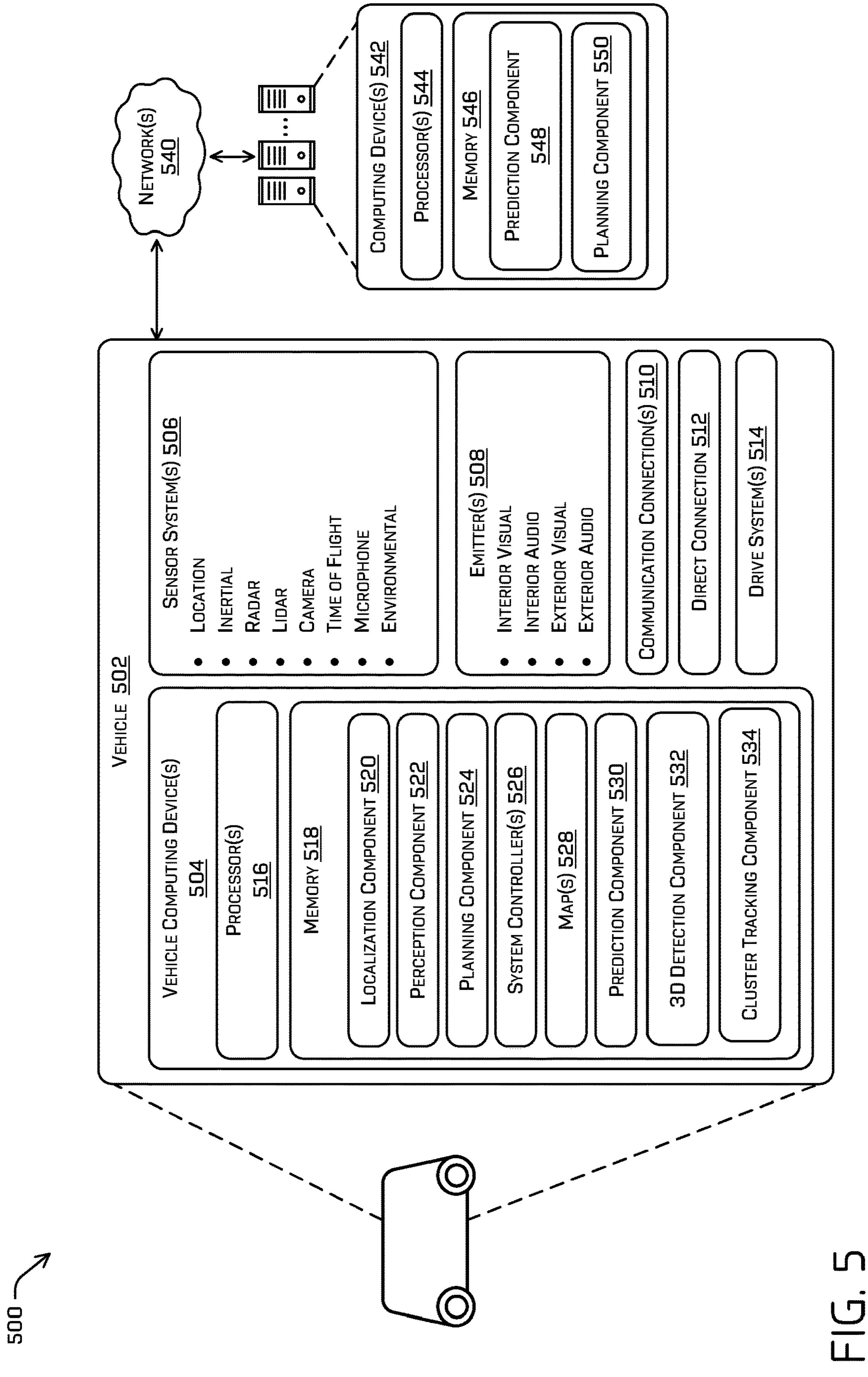
FIG. 5 depicts a block diagram of an example system for implementing the techniques described herein.

FIG. 5 depicts a block diagram of an example system 500 for implementing the techniques described herein. In at least one example, the system 500 can include a vehicle 502. The vehicle 502 can include a vehicle computing system or device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 524, one or more system controllers 526, one or more maps 528, a prediction component 530, a 3D object detection component 532, and a cluster tracker model 534. Though depicted in FIG. 5 as residing in memory 518 for illustrative purposes, it is contemplated that each of the localization component 520, the perception component 522, the planning component 524, the one or more system controllers 526, the one or more maps 528, and the prediction component 530 can additionally, or alternatively, be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, and yaw (h)). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization, and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 522 can provide processed sensor data that indicates one or more characteristics associated with a detected entity (e.g., a tracked object) and/or the environment in which the entity is positioned. The perception component 522 may use the multichannel data structures as described herein, such as the multichannel data structures generated by a deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment, for example, using sideslip vectors, four-wheeled steering-related operations, and other aspects described herein. In examples, the planning component 524 can determine various routes and trajectories and various levels of detail. For example, the planning component 524 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints may include streets, intersections, global positioning system (GPS) coordinates, etc. Further, the planning component 524 can generate an instruction (e.g., control) for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

The memory 518 can further include one or more maps 528 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 528 can include at least one map (e.g., images and/or a mesh). In some examples, the vehicle 502 can be controlled based at least in part on the maps 528. That is, the maps 528 can be used in connection with the localization component 520, the perception component 522, and/or the planning component 524 to determine a location of the vehicle 502, identify objects in an environment, and/or generate routes and/or trajectories to navigate within an environment.

In some examples, the one or more maps 528 can be stored on a remote computing device(s) (such as the computing device(s) 542) accessible via network(s) 540. In some examples, multiple maps 528 can be stored based on, for example, a characteristic (e.g., type of entity, time of day, day of week, season of the year, etc.). Storing multiple maps 528 can have similar memory requirements but increase the speed at which data in a map can be accessed.

In general, the prediction component 530 can generate predicted trajectories of objects in an environment. For example, the prediction component 530 can generate one or more predicted trajectories for vehicles, pedestrians, animals, and the like within a threshold distance from the vehicle 502. In some instances, the prediction component 530 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 518 (and the memory 546, discussed below) can be implemented as a neural network. For instance, the memory 518 may include a deep tracking network that may be configured with a convolutional neural network (CNN). The CNN may include one or more convolution/deconvolution layers.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the camera sensors can include multiple cameras disposed at various locations about the exterior and/or interior of the vehicle 502. The sensor system(s) 506 can provide input to the vehicle computing device 504. Additionally, or alternatively, the sensor system(s) 506 can send sensor data, via the one or more networks 540, to the one or more computing device(s) at a particular frequency, after a lapse of a predetermined period of time, in near real-time, etc.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data, audio data, collision data, and/or other types of data to one or more computing device(s) 542 via the network(s) 540. In some examples, the vehicle 502 can send raw sensor data to the computing device(s) 542. In other examples, the vehicle 502 can send processed sensor data and/or representations of sensor data (e.g., multichannel data structures representing sensor data) to the computing device(s) 542. In some examples, the vehicle 502 can send sensor data to the computing device(s) 542 at a particular frequency, after a lapse of a predetermined period of time, in near real-time, etc. In some cases, the vehicle 502 can send sensor data (raw or processed) to the computing device(s) 542 as one or more log files.

The computing device(s) 542 can include processor(s) 544 and a memory 546 storing one or more prediction components 548, and planning components 550. In some instances, the prediction component 548 can substantially correspond to the prediction component 530 and can include substantially similar functionality. In some instances, the planning component 550 can substantially correspond to the planning component 524 and can include substantially similar functionality.

The processor(s) 516 of the vehicle 502 and the processor(s) 544 of the computing device(s) 542 can be any suitable processor capable of executing instructions to process data and perform operations as described herein. By way of example and not limitation, the processor(s) 516 and 544 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 542 and/or components of the computing device(s) 542 can be associated with the vehicle 502. That is, the vehicle 502 can perform one or more of the functions associated with the computing device(s) 542, and vice versa.

Example Clauses

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

A: A system comprising: one or more processors; and one or more non-transitory computer-readable media storing computer-executable instructions that, when executed, cause the one or more processors to perform operations comprising: receiving sensor data associated with an environment of an autonomous vehicle, wherein the sensor data comprises first sensor data associated with a first time and second sensor data associated with a second time; detecting, by a perception component of the autonomous vehicle and based at least in part on the sensor data, a first three-dimensional bounding area corresponding to a track associated with a first object in the environment; determining, based on the first sensor data and the second sensor data, a first point track and a second point track, wherein the first point track is associated with first movement data and the second point track is associated with second movement data; determining, based on the first movement data and the second movement data, that the first point track and the second point track are part of a first cluster track, wherein the first cluster track represents a set of point tracks that collectively move across a time period comprising the first time and the second time, wherein determining that the first point track and the second point track are part of the first cluster track comprises: determining a first score associated with a first hypothesis, the first hypothesis representing that the first point track and the second point track are part of the first cluster track, determining a second score associated with a second hypothesis, the second hypothesis representing that the first point track is part of a second cluster track and the second point track is part of a third cluster track, and determining that the first score exceeds the second score; determining that the first three-dimensional bounding area and the first cluster track are related; based on determining that the first three-dimensional bounding area and the first cluster track are related, determining a mismatch region of the first cluster track, wherein the mismatch region represents a portion of the first cluster track that is outside the first three-dimensional bounding area; determining a second three-dimensional bounding area based on the mismatch region; updating the first three-dimensional bounding area to include the second three-dimensional bounding area; and controlling the autonomous vehicle based on the first three-dimensional bounding area.

B: The system of paragraph A, wherein the first movement data represents: a position shift associated with the first point track between the first time and the second time, and a speed associated with the position shift.

C: The system of paragraph A or B, the operations further comprising: updating the first score and the second score based on third sensor data associated with a third time and fourth sensor data associated with a fourth time; determining that the second score exceeds the first score; based on determining that the second score exceeds the first score, determining that the first point track is part of the second cluster track and the second point track is part of the third cluster track; determining that the second cluster track and the first three-dimensional bounding area are related; based on determining that the second cluster track and the first three-dimensional bounding area are related, determining a second mismatch region, the second mismatch region representing a second portion of the second cluster track that is outside first three-dimensional bounding area that is not covered; and controlling the autonomous vehicle based on the mismatch region.

D: The system of any of paragraphs A-C, wherein controlling the autonomous vehicle based at least in part on the mismatch region comprises: determining a trajectory that avoids an area associated with the mismatch region; and controlling the autonomous vehicle based on the trajectory.

E: The system of any of paragraphs A-D, wherein: the first score is associated with a first set of cluster tracks determined based on at least a portion of the environment, and the first set of cluster tracks includes the first cluster track.

F: One or more non-transitory computer-readable media storing instructions executable by one or more processors, wherein the instructions, when executed, cause the one or more processors to perform operations comprising: receiving sensor data associated with an environment of a vehicle, wherein the sensor data comprises first sensor data associated with a first time and second sensor data associated with a second time; detecting a first three-dimensional bounding area, wherein the first three-dimensional bounding area is associated with a first object in the environment; determining, based on the first sensor data and the second sensor data, first movement data associated with a first measurement in the first sensor data and second movement data associated with a second measurement in the first sensor data; determining, based on the first movement data and the second movement data, that the first measurement and the second measurement are associated with a first cluster track; and controlling the vehicle based on the first cluster track.

G: The one or more non-transitory computer-readable media of paragraph F, wherein the first movement data represents: a position shift associated with the first measurement between the first time and the second time, and a speed associated with the position shift.

H: The one or more non-transitory computer-readable media of paragraph F or G, wherein determining the first cluster track comprises: determining a first point track based on the first measurement; determining a second point track based on the second measurement; determining, based on the first movement data and the second movement data, that a set of point tracks comprising the first point track and the second point track move collectively; and determining the first cluster track based on the set of point tracks.

I: The one or more non-transitory computer-readable media of any of paragraphs F-H, wherein detecting the first three-dimensional bounding area comprises: detecting the first three-dimensional bounding area based on a multi-hypothesis tracking algorithm.

J: The one or more non-transitory computer-readable media of any of paragraphs F-I, wherein controlling the vehicle comprises: determining a mismatch region associated with the first cluster track and the first three-dimensional bounding area; determining a second three-dimensional bounding area based on the mismatch region; updating the first three-dimensional bounding area to include the second three-dimensional bounding area; and controlling the vehicle based on the first three-dimensional bounding area.

K: The one or more non-transitory computer-readable media of any of paragraphs F-J, wherein controlling the vehicle comprises: determining a trajectory that avoids an area associated with a mismatch region associated with the first cluster track and the first three-dimensional bounding area; and controlling the vehicle based on the trajectory.

L: The one or more non-transitory computer-readable media of any of paragraphs F-K, wherein determining that the first measurement and the second measurement are part of the first cluster track comprises: determining a first score associated with a first hypothesis, the first hypothesis representing that the first measurement and the second measurement are part of the first cluster track, determining a second score associated with a second hypothesis, the second hypothesis representing that the first measurement is part of a second cluster track and the second measurement is part of a third cluster track, and determining that the first score exceeds the second score.

M: The one or more non-transitory computer-readable media of any of paragraphs F-L, wherein: detecting the first three-dimensional bounding area comprises detecting the first three-dimensional bounding area using a first model, and the operations further comprise: determining training data based on a mismatch region associated with the first cluster track and the first three-dimensional bounding area, and training the first model based on the training data.

N: The one or more non-transitory computer-readable media of any of paragraphs F-M, the operations further comprising: determining a first estimated location associated with the first three-dimensional bounding area within the environment; determining a second estimated location associated with the first cluster track within the environment; and determining that the first three-dimensional bounding area and the first cluster track are related based on the first estimated location and the second estimated location.

O: A method comprising: receiving sensor data associated with an environment of a vehicle, wherein the sensor data comprises first sensor data associated with a first time and second sensor data associated with a second time; detecting a first three-dimensional bounding area, wherein the first three-dimensional bounding area is associated with a first object in the environment; determining, based on the first sensor data and the second sensor data, first movement data associated with a first measurement in the first sensor data and second movement data associated with a second measurement in the first sensor data; determining, based on the first movement data and the second movement data, that the first measurement and the second measurement are associated with a first cluster track; and controlling the vehicle based on the first cluster track.

P: The method of paragraph O, wherein the first movement data represents: a position shift associated with the first measurement between the first time and the second time, and a speed associated with the position shift.

Q: The method of paragraph O or P, wherein determining the first cluster track comprises: determining a first point track based on the first measurement; determining a second point track based on the second measurement; determining, based on the first movement data and the second movement data, that a set of point tracks comprising the first point track and the second point track move collectively; and determining the first cluster track based on the set of point tracks.

R: The method of any of paragraphs O-Q, wherein detecting the first three-dimensional bounding area comprises: detecting the first three-dimensional bounding area based on a multi-hypothesis tracking algorithm.

S: The method of any of paragraphs O-R, wherein controlling the vehicle comprises: determining a mismatch region associated with the first cluster track and the first three-dimensional bounding area; determining a second three-dimensional bounding area based on the mismatch region; updating the first three-dimensional bounding area to include the second three-dimensional bounding area; and controlling the vehicle based on the first three-dimensional bounding area.

T: The method of any of paragraphs O-S, wherein controlling the vehicle comprises: determining a trajectory that avoids an area associated with a mismatch region associated with the first cluster track and the first three-dimensional bounding area; and controlling the vehicle based on the trajectory.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

The invention claimed is:

1. A system comprising:

one or more processors; and one or more non-transitory computer-readable media storing computer-executable instructions that, when executed, cause the one or more processors to perform operations comprising:

receiving sensor data associated with an environment of an autonomous vehicle, wherein the sensor data comprises first sensor data associated with a first time and second sensor data associated with a second time;

detecting, by a perception component of the autonomous vehicle and based at least in part on the sensor data, a first three-dimensional bounding area corresponding to a track associated with a first object in the environment;

determining, based on the first sensor data and the second sensor data, a first point track and a second point track, wherein the first point track is associated with first movement data and the second point track is associated with second movement data;

determining, based on the first movement data and the second movement data, that the first point track and the second point track are part of a first cluster track, wherein the first cluster track represents a set of point tracks that collectively move across a time period comprising the first time and the second time, wherein determining that the first point track and the second point track are part of the first cluster track comprises:

determining a first score associated with a first hypothesis, the first hypothesis representing that the first point track and the second point track are part of the first cluster track, determining a second score associated with a second hypothesis, the second hypothesis representing that the first point track is part of a second cluster track and the second point track is part of a third cluster track, and determining that the first score exceeds the second score;

determining that the first three-dimensional bounding area and the first cluster track are related;

based on determining that the first three-dimensional bounding area and the first cluster track are related, determining a mismatch region of the first cluster track, wherein the mismatch region represents a portion of the first cluster track that is outside the first three-dimensional bounding area;

determining a second three-dimensional bounding area based on the mismatch region;

updating the first three-dimensional bounding area to include the second three-dimensional bounding area; and controlling the autonomous vehicle based on the first three-dimensional bounding area.

2. The system of claim 1, wherein the first movement data represents:

a position shift associated with the first point track between the first time and the second time, and a speed associated with the position shift.

3. The system of claim 1, the operations further comprising:

updating the first score and the second score based on third sensor data associated with a third time and fourth sensor data associated with a fourth time;

determining that the second score exceeds the first score;

based on determining that the second score exceeds the first score, determining that the first point track is part of the second cluster track and the second point track is part of the third cluster track;

determining that the second cluster track and the first three-dimensional bounding area are related;

based on determining that the second cluster track and the first three-dimensional bounding area are related, determining a second mismatch region, the second mismatch region representing a second portion of the second cluster track that is outside the first three-dimensional bounding area that is not covered; and controlling the autonomous vehicle based on the mismatch region.

4. The system of claim 1, wherein controlling the autonomous vehicle based at least in part on the mismatch region comprises:

determining a trajectory that avoids an area associated with the mismatch region; and controlling the autonomous vehicle based on the trajectory.

5. The system of claim 1, wherein:

the first score is associated with a first set of cluster tracks determined based on at least a portion of the environment, and the first set of cluster tracks includes the first cluster track.

6. One or more non-transitory computer-readable media storing instructions executable by one or more processors, wherein the instructions, when executed, cause the one or more processors to perform operations comprising:

receiving sensor data associated with an environment of a vehicle, wherein the sensor data comprises first sensor data associated with a first time and second sensor data associated with a second time;

detecting a first three-dimensional bounding area, wherein the first three-dimensional bounding area is associated with a first object in the environment;

determining, based on the first sensor data and the second sensor data, first movement data associated with a first measurement in the first sensor data and second movement data associated with a second measurement in the first sensor data;

determining, based at least in part on the first measurement and the second measurement moving collectively, a first cluster track, wherein the first cluster track comprises a set of measurements moving collectively;

determining, based on the first movement data, the second movement data, and the first cluster track, that the first cluster track comprises the first measurement and the second measurement; and controlling the vehicle based on the first cluster track.

7. The one or more non-transitory computer-readable media of claim 6, wherein determining the first cluster track comprises:

determining a first point track based on the first measurement;

determining a second point track based on the second measurement;

determining, based on the first movement data and the second movement data, that a set of point tracks comprising the first point track and the second point track move collectively; and determining the first cluster track based on the set of point tracks.

8. The one or more non-transitory computer-readable media of claim 6, wherein detecting the first three-dimensional bounding area comprises:

detecting the first three-dimensional bounding area based on a multi-hypothesis tracking algorithm.

9. The one or more non-transitory computer-readable media of claim 6, wherein controlling the vehicle comprises:

determining a mismatch region associated with the first cluster track and the first three-dimensional bounding area;

determining a second three-dimensional bounding area based on the mismatch region;

updating the first three-dimensional bounding area to include the second three-dimensional bounding area; and controlling the vehicle based on the first three-dimensional bounding area.

10. The one or more non-transitory computer-readable media of claim 6, wherein determining that the first measurement and the second measurement are part of the first cluster track comprises:

determining a first score associated with a first hypothesis, the first hypothesis representing that the first measurement and the second measurement are part of the first cluster track, determining a second score associated with a second hypothesis, the second hypothesis representing that the first measurement is part of a second cluster track and the second measurement is part of a third cluster track, and determining that the first score exceeds the second score.

11. The one or more non-transitory computer-readable media of claim 6, wherein:

detecting the first three-dimensional bounding area comprises detecting the first three-dimensional bounding area using a first model, and the operations further comprise:

determining training data based on a mismatch region associated with the first cluster track and the first three-dimensional bounding area, and training the first model based on the training data.

12. The one or more non-transitory computer-readable media of claim 6, the operations further comprising:

determining a first estimated location associated with the first three-dimensional bounding area within the environment;

determining a second estimated location associated with the first cluster track within the environment; and determining that the first three-dimensional bounding area and the first cluster track are related based on the first estimated location and the second estimated location.

13. A method comprising:

receiving sensor data associated with an environment of a vehicle, wherein the sensor data comprises first sensor data associated with a first time and second sensor data associated with a second time;

detecting a first three-dimensional bounding area, wherein the first three-dimensional bounding area is associated with a first object in the environment;

determining, based on the first sensor data and the second sensor data, first movement data associated with a first measurement in the first sensor data and second movement data associated with a second measurement in the first sensor data;

determining, based at least in part on the first measurement and the second measurement moving collectively, a first cluster track, wherein the first cluster track comprises a set of measurements moving collectively;

determining, based on the first movement data, the second movement data, and the first cluster track, that the first measurement and the second measurement are associated with the first cluster track; and controlling the vehicle based on the first cluster track.

14. The method of claim 13, wherein the first movement data represents:

a position shift associated with the first measurement between the first time and the second time, and a speed associated with the position shift.

15. The method of claim 13, wherein determining the first cluster track comprises:

determining a first point track based on the first measurement;

determining a second point track based on the second measurement;

determining, based on the first movement data and the second movement data, that a set of point tracks comprising the first point track and the second point track move collectively; and determining the first cluster track based on the set of point tracks.

16. The method of claim 13, wherein detecting the first three-dimensional bounding area comprises:

detecting the first three-dimensional bounding area based on a multi-hypothesis tracking algorithm.

17. The method of claim 13, wherein controlling the vehicle comprises:

determining a mismatch region associated with the first cluster track and the first three-dimensional bounding area;

determining a second three-dimensional bounding area based on the mismatch region;

updating the first three-dimensional bounding area to include the second three-dimensional bounding area; and controlling the vehicle based on the first three-dimensional bounding area.

18. The method of claim 13, wherein controlling the vehicle comprises:

determining a trajectory that avoids an area associated with a mismatch region associated with the first cluster track and the first three-dimensional bounding area; and controlling the vehicle based on the trajectory.

19. The method of claim 13, further comprising:

determining, based at least in part on the first measurement and the second measurement, that the first cluster track and the first three-dimensional bounding area are associated with the first object in the environment.

20. The method of claim 13, wherein:

the first measurement and the second measurement are associated with a region of interest, the region of interest comprising:

an area around the first three-dimensional bounding area, and the first three-dimensional bounding area.

* * * * *